US006807631B2

(12) United States Patent
Fuller, III et al.

(10) Patent No.: US 6,807,631 B2
(45) Date of Patent: Oct. 19, 2004

(54) SYSTEM AND METHOD FOR DEPLOYING A HARDWARE CONFIGURATION WITH A COMPUTER PROGRAM

(75) Inventors: David W Fuller, III, Austin, TX (US); John David Stanhope, Pflugerville, TX (US); Joseph Albert Savage, Cedar Park, TX (US); Gregory Clark Richardson, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 522 days.

(21) Appl. No.: 09/991,770

(22) Filed: Nov. 16, 2001

(65) Prior Publication Data

US 2003/0097551 A1 May 22, 2003

(51) Int. Cl.[7] .............................................. G06F 13/00
(52) U.S. Cl. .............................. 713/100; 713/1; 713/2; 714/26; 714/46; 714/47; 714/48
(58) Field of Search ............................... 713/1, 2, 100; 714/26, 46, 47, 48

(56) References Cited

U.S. PATENT DOCUMENTS 6,029,258 A * 2/2000 Ahmad ........................ 714/46
6,189,050 B1 * 2/2001 Sakarda ....................... 710/18
6,237,029 B1 * 5/2001 Master et al. ............... 709/217
6,449,624 B1   9/2002 Hammack et al.

* cited by examiner

Primary Examiner—Rehana Perveen
(74) Attorney, Agent, or Firm—Meyertons Hood Kivlin Kowert & Goetzel, P.C.; Jeffrey C. Hood; Jason L. Burgess (57) ABSTRACT

A system and method for deploying a hardware configuration with a computer program. The program may perform an instrumentation, measurement/control, industrial automation, or machine vision function, or other type of function utilizing hardware devices, and the behavior of the program may depend on various aspects of the hardware configuration of the computer system. An installation bundle that includes configuration information related to the hardware devices with which the program interacts may be automatically created and used to deploy the program on a new computer system. The installation bundle may include program instructions operable to install the program on the new computer system and automatically modify the hardware configuration of the new computer system so that the program will execute correctly.

23 Claims, 8 Drawing Sheets

SYSTEM AND METHOD FOR DEPLOYING A HARDWARE CONFIGURATION WITH A COMPUTER PROGRAM

FIELD OF THE INVENTION

The present invention relates to the field of computer program installation, and more particularly to a system and method for deploying a hardware configuration with a computer program, e.g., in order to enable a computer program that interacts with hardware devices to execute correctly when installed on a new computer system. In one embodiment, the computer program may perform an instrumentation function, such as a test and measurement or industrial automation function, and deploying the hardware configuration may enable the program to correctly interact with an instrument connected to the new computer system.

DESCRIPTION OF THE RELATED ART

Computer systems are used to interact with hardware devices or instruments in many fields, including the fields of instrumentation, process control, industrial automation, simulation, machine vision, motion control, and multimedia, among others. For example, a computer system may interact with instruments to measure and/or control various types of systems. These systems may include any of various types of physical, mechanical, electrical, chemical, or thermodynamic elements or phenomena, among others, or some combination of such elements or phenomena. Exemplary systems include: an engine or an engine component, a device in motion, a chemical reaction, a petroleum refining process, a room maintained at a setpoint temperature, a system of liquids flowing among different tanks, etc.

In an application such as a measurement/control application, a computer system may interact with one or more sensors/transducers operable to sense one or more variables of a system and output a signal based on the variables. The signals produced by the sensors/transducers are most typically an electrical signal, e.g., a voltage or current, but may also be any of various other types of signals. In various applications, the computer system may also interact with one or more control devices/actuators, e.g., to provide control signals affecting a system. In some cases, a single instrument or device may serve as both a sensor and a control device.

Users commonly develop computer programs to interact with the devices or instruments connected to or included in a computer system, e.g., using various application development environments. For example, many different software applications specialized for developing instrumentation, test and measurement, and industrial automation programs are available. These programs may, for example, interface with device driver software in order to interact with a device.

In order to enable a computer program and/or the device drivers called by a computer program to correctly interact with a hardware device, it is often necessary to perform various types of hardware configuration. For example, consider a computer program that interacts with a data acquisition (DAQ) plug-in board to acquire and analyze data. In order for the program to execute correctly, it may be necessary to configure hardware interrupts for the DAQ board, configure gain settings, etc. Also, the program may refer to a particular DAQ channel by a name associated with the channel. Thus it may also be necessary to configure these name associations.

The user often uses separate configuration utilities to configure the hardware devices connected to a computer system as desired. A computer program may then be written based on the user's knowledge of the hardware configuration state of the computer system that will execute the program. For example, a program that analyzes a signal acquired from a device may require a gain associated with the device to be set to a particular value in order for the program to function correctly. Thus, the execution behavior of a program that interacts with a hardware device may depend not only on the program code, but may also depend on various aspects of the hardware configuration of the computer system on which the program executes.

After a computer program has been developed, it is often necessary to deploy the program on a new computer system. For example, the program may have been developed for commercial distribution, or the user may need to execute the program on multiple computers, e.g., in order to interact with multiple physical systems. In the prior art, the dependency of a program on the hardware configuration of a computer system is often problematic when the user attempts to deploy the program on a new computer system. For example, the hardware devices connected to the new computer system may be configured differently, or various named channels or I/O operations used by the program may not exist on the new computer system or may be used in conflicting ways.

Thus, in order for the program to execute correctly on the new computer system, the user may be required to manually specify the necessary configuration information, e.g., by running separate configuration utilities. This can be a difficult and time-consuming task. Requiring users to perform this type of manual configuration is especially undesirable when a program is distributed commercially.

In some cases, it may be possible to include code in the computer program that is operable to perform various hardware configuration operations. However, requiring the program developer to include these types of operations in a program is undesirable, since coding these configuration operations can be error-prone and time-consuming. It would be better if the developer only needed to concentrate on the function of the program.

Thus, it would be desirable to provide a system and method for deploying a hardware configuration with a computer program, to enable a program that interacts with hardware devices to execute correctly when installed on a new computer system.

SUMMARY OF THE INVENTION

One embodiment of the present invention comprises a system and method for deploying a hardware configuration with a computer program. A program developer may develop a program that interacts with one or more hardware devices or instruments on a computer system. For example, the program may interact with the hardware device(s) in order to perform an instrumentation, measurement/control, industrial automation, or machine vision function, or any of various other types of functions utilizing hardware devices.

As described above, the behavior of the program during execution may depend on various aspects of the hardware configuration of the computer system on which the program executes. One embodiment of the present invention enables the developer to automatically create an installation bundle that includes configuration information related to the hardware devices with which the program interacts. The installation bundle may then be used to deploy the program on a new computer system. For example, the installation bundle may include program instructions operable to install the program on the new computer system and automatically configure hardware devices connected to the new computer system so that the program will execute correctly.

In various embodiments, any of various types of configuration information may be included in the installation bundle. For example, various hardware device types and standards are commonly used, such as DAQ, GPIB, VXI, PXI, etc. If a program interacts with a DAQ device, for example, the configuration information may include information specifying various settings for the DAQ hardware, such as interrupts, gain values, etc. In this case, the configuration information may also include information specifying various named elements that the program uses, such as named channels, named I/O operations, etc.

The configuration information may be determined in any of various ways. For example, the method may operate to determine functions, methods, subprograms, graphical program nodes, etc., that are called by or included in the program and are related to a hardware device. These functions, methods, etc., may be determined in various ways, e.g., depending on the type of program, the application development environment or language used to create the program, etc. For example, an application development environment used to create the program may provide libraries related to various types of hardware devices, such as DAQ devices, GPIB devices, VXI devices, P)U devices, etc. Thus, the method may determine whether the program uses any of these libraries, and if so, may determine hardware configuration information related to the library. For example, if a DAQ library is used, DAQ hardware configuration information may be included in the installation bundle. In one embodiment, separate modules may be used to determine hardware configuration information related to different types of hardware devices.

In one embodiment, the program may be a graphical program, i.e., a program that includes a plurality of interconnected nodes that visually indicate the function of the program. In this case, the method may examine nodes included in the graphical program, such as function nodes or subprogram nodes, and may determine whether any nodes related to hardware devices are included in the program.

The configuration information may be stored in the installation bundle in any way desired. This information may include text and/or binary information. In one embodiment, the configuration information is represented using XML.

When the user executes the program instructions included in the installation bundle, the program instructions may examine the configuration information to determine the hardware requirements of the program and may change the configuration of one or more hardware devices on the new computer system if necessary. For each type of device that the program interacts with, the installation bundle may interface with a separate deployment module corresponding to the device type, wherein the deployment module is operable to configure devices of that type on the new computer system.

As an example, consider a case where the original computer system includes a DAQ plug-in board and that the program uses a named DAQ channel to interact with the DAQ board. In this case, information regarding the named DAQ channel may be included in the installation bundle. When the program is installed on the new computer system, a DAQ deployment module may be operable to create a DAQ channel of the same name on the new computer system, so that the program will not fail when it attempts to use this channel.

The deployment module may also resolve hardware conflicts and may include knowledge of how to configure the hardware information on the new computer system such that the configuration is not exactly like the configuration of the original computer system, but is appropriate for the new computer system and enables the program to execute correctly. For example, if a DAQ device was installed in PCI slot 0 of the original computer, and a DAQ device is installed in PCI slot 1 on the new computer, the deployment module may determine that the DAQ device installed in PCI slot 1 can be used.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following reference is hereby incorporated by reference in its entirety as though fully and completely set forth herein:

U.S. patent application Ser. No. 09/518,492 titled "System and Method for Programmatically Creating a Graphical Program," filed Mar. 3, 2000.

Figure 1A:
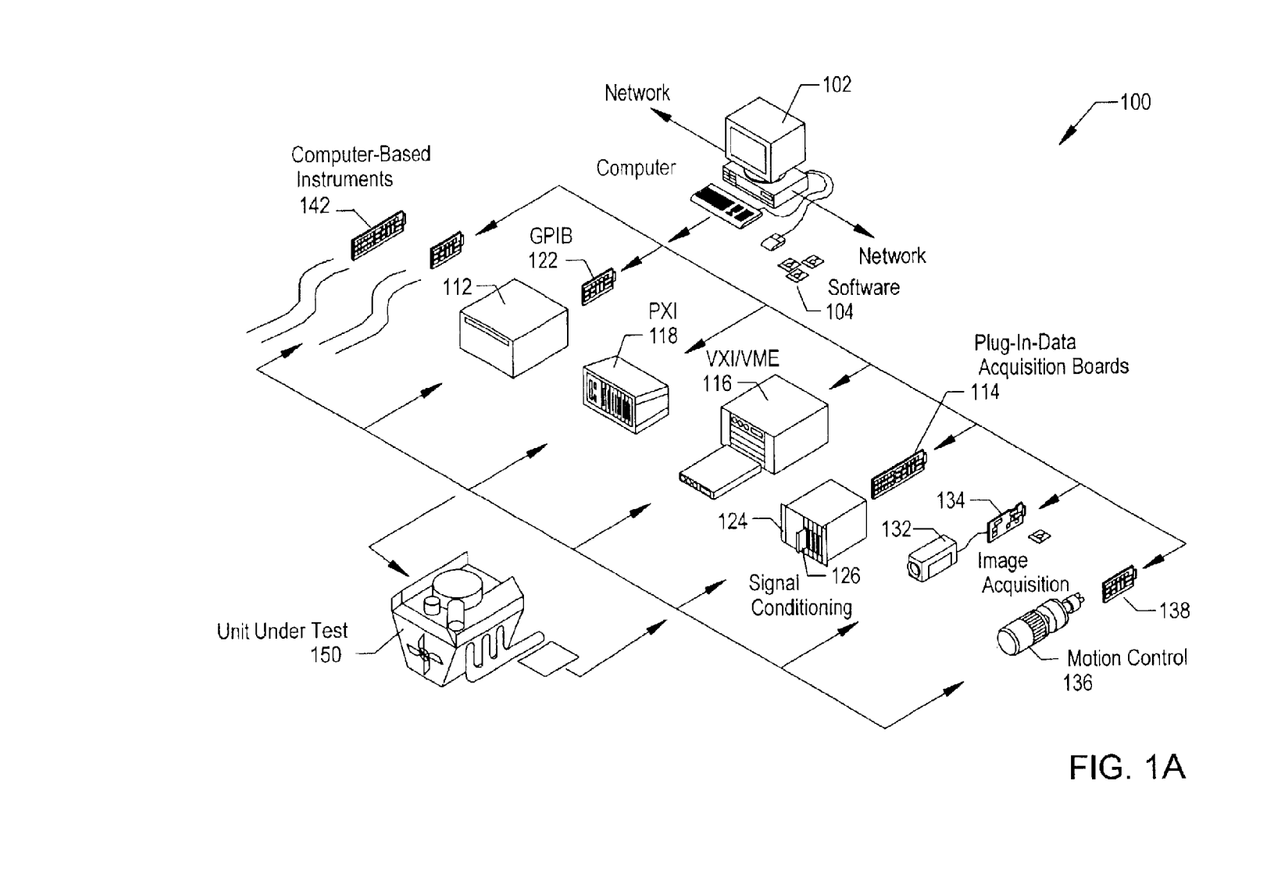
FIGS. 1A and 1B illustrate representative instrumentation and process control systems including various I/O interface options.
Figure 1B:
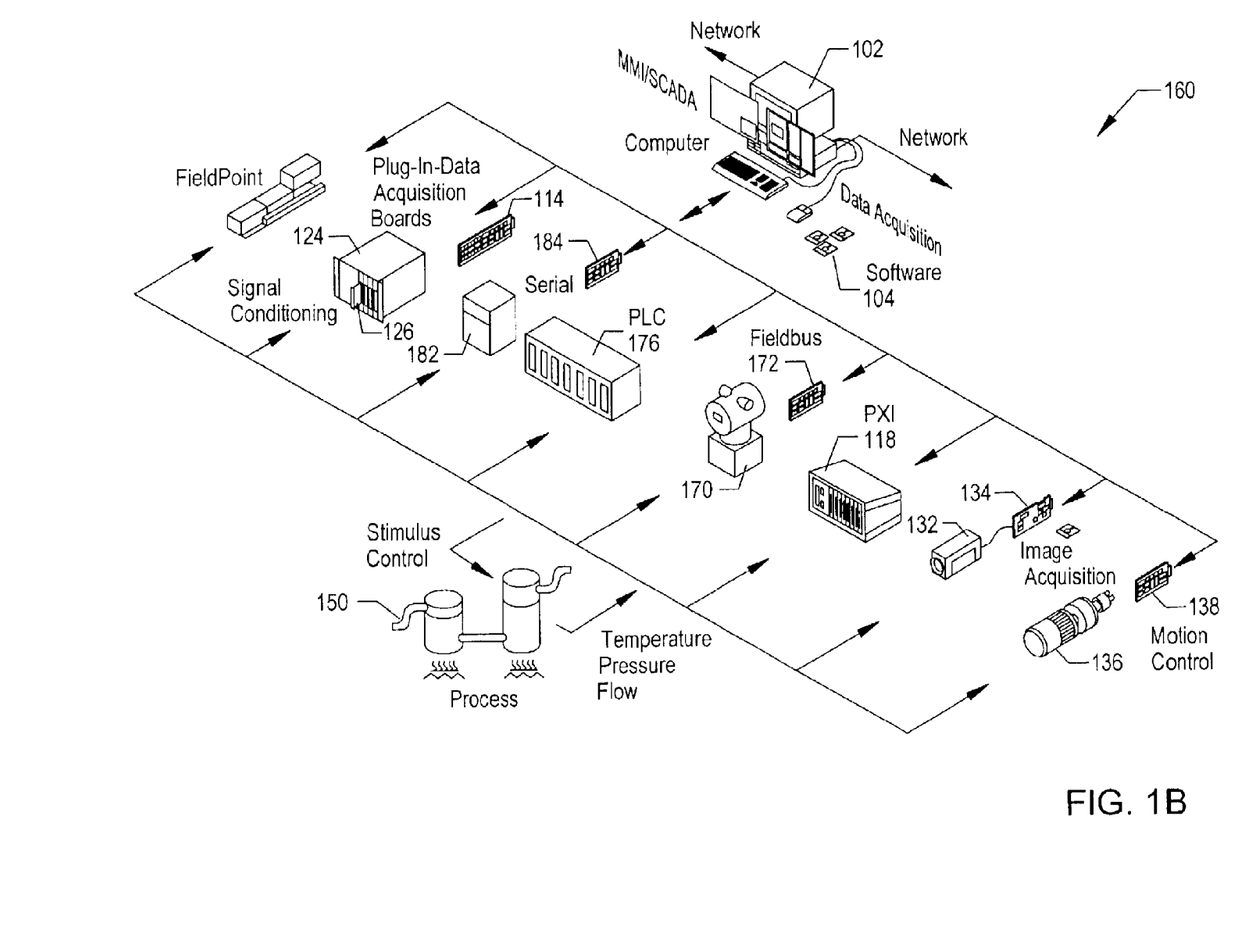

FIGS. 1A and 1B—Instrumentation and Industrial Automation Systems

As described above, it is often desirable to install a computer program on a computer system, wherein the computer program performs a function that requires the use of one or more hardware devices or instruments connected to the computer system. The computer program may be stored on a first computer system and may be configured to execute correctly on that computer system, and it may be desirable to install the program on a second computer system. According to one embodiment of a method described below, configuration information representing a hardware configuration of the first computer system may be automatically, i.e., programmatically, created. The configuration information may then be stored with the computer program or otherwise associated with the computer program. The configuration information may be used in installing the program on the second computer system, such that the second computer system is automatically configured to execute the program correctly. This may involve modifying a hardware configuration of the second computer system to enable the program to correctly utilize one or more hardware devices or instruments connected to the second computer system.

FIGS. 1A and 1B illustrate exemplary computer systems which may execute a computer program that utilizes a hardware device or instrument. For example, the program may perform an instrumentation or measurement function, such as a test and measurement function or an industrial automation function. The computer systems illustrated in FIGS. 1A and 1B may be either of the first or second computer systems described above. Embodiments of the invention may be used to create, store, and/or use configuration information associated with any of the devices shown in FIGS. 1A and 1B. It is noted that the systems of FIGS. 1A and 1B are exemplary, and any type of system may utilize the methods described herein.

FIG. 1A illustrates an exemplary instrumentation control system 100. The system 100 may comprise a host computer 102 which connects to one or more instruments. The host computer 102 may comprise a CPU, a display screen, memory, and one or more input devices such as a mouse or keyboard as shown. The computer 102 may connect through the one or more instruments to analyze, measure, or control a unit under test (UUT) or process 150.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 1B illustrates an exemplary industrial automation system 160. The industrial automation system 160 is similar to the instrumentation or test and measurement system 100 shown in FIG. 1A. Elements which are similar or identical to elements in FIG. 1A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system(s) 102 may each include a memory medium(s) on which one or more computer programs or software components according to one embodiment of the present invention may be stored. For example, the memory medium may store a program operable to programmatically create hardware configuration information representing at least a portion of the hardware configuration of the computer system 102. In one embodiment, the program that creates the hardware configuration information may be (or be part of) an application development environment used to create a computer program that utilizes one or more of the hardware devices connected to the computer 102. For example, the user may request the application development environment to package the program into an installation bundle that can be used to install the program on a new computer system. In response, the application development environment may automatically, i.e., programmatically, create the hardware configuration information and include it in the installation bundle, such that the hardware configuration information can be used when installing the program to appropriately configure hardware settings of the new computer system so that the new computer system can execute the program correctly.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system, instrument, or other device. In general, the term "computer system" can be broadly defined to encompass any device having at least one processor which executes instructions from a memory medium.

Figure 2:
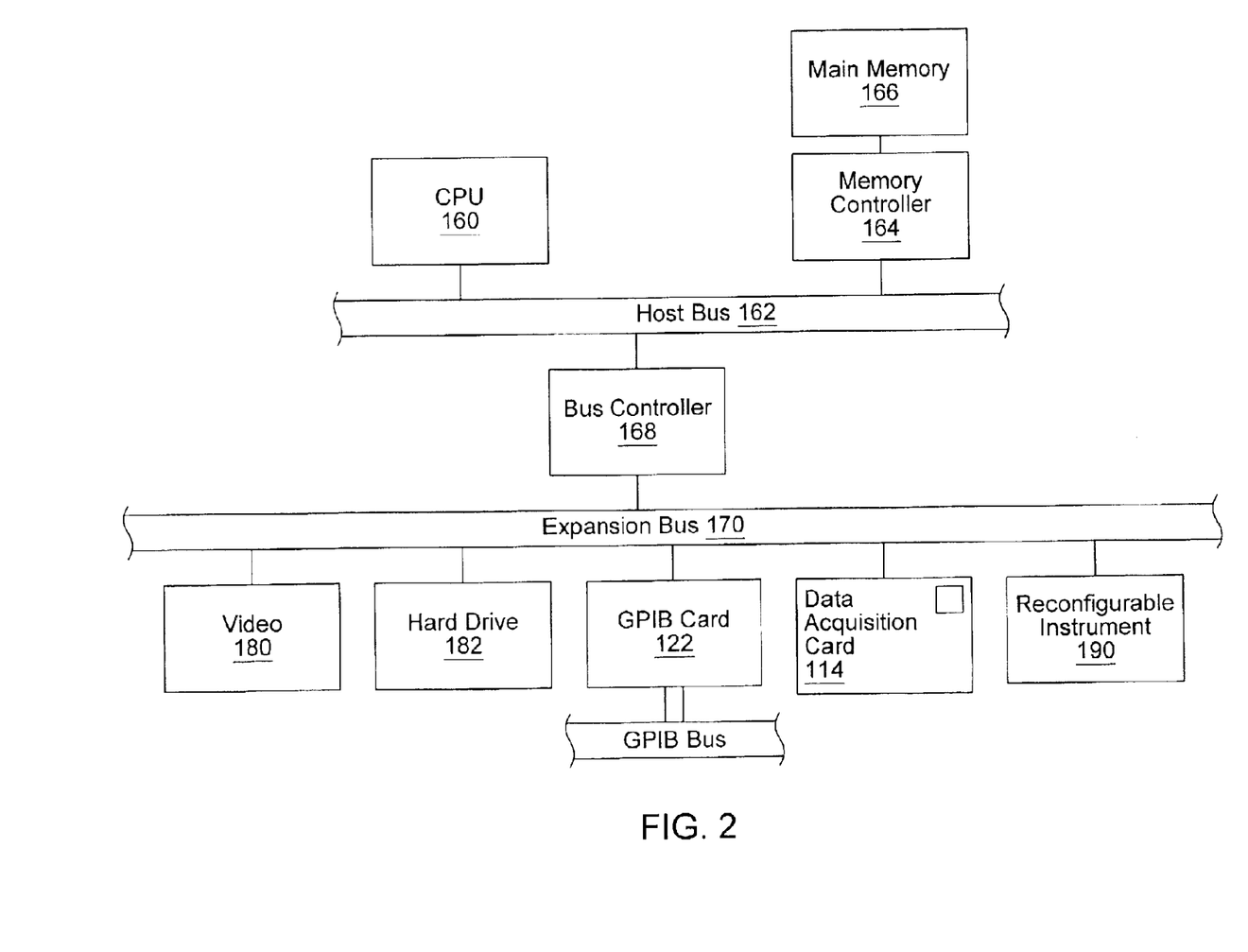
FIG. 2 is a block diagram of the computer system of FIGS. 1A and 1B.

FIG. 2—Computer System Block Diagram

FIG. 2 is a block diagram representing one embodiment of the computer system 102 illustrated in FIGS. 1A and 1B. It is noted that any type of computer system configuration or architecture can be used as desired, and FIG. 2 illustrates a representative PC embodiment. It is also noted that the computer system may be a general purpose computer system as shown in FIGS. 1A and 1B, a computer implemented on a VXI card installed in a VXI chassis, a computer implemented on a PXM card installed in a PXI chassis, or other types of embodiments. Elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

FIG. 2 may represent either the first computer system on which the program desired to be deployed is originally located or the second computer system on which the program is to be deployed. In the first instance, the main memory 166 may store one or more programs operable to create an installation bundle including hardware configuration information usable to configure the second computer system to appropriately execute the program, as described above. In the second instance, the main memory 166 may store one or more programs operable to install the program on the second computer system and modify a hardware configuration of the second computer system, including the ability to resolve hardware configuration conflicts, as described in detail below. The main memory 166 may also store operating system software as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as the data acquisition board 114 (of FIG. 1A) and a GPIB interface card 122 which provides a GPIB bus interface to the GPIB instrument 112 (of FIG. 1A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. In one embodiment, the program to be deployed may be downloaded and executed on the reconfigurable instrument 190. For example, an application development environment with which the program is associated may provide support for downloading a program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 1A.

Figure 3:
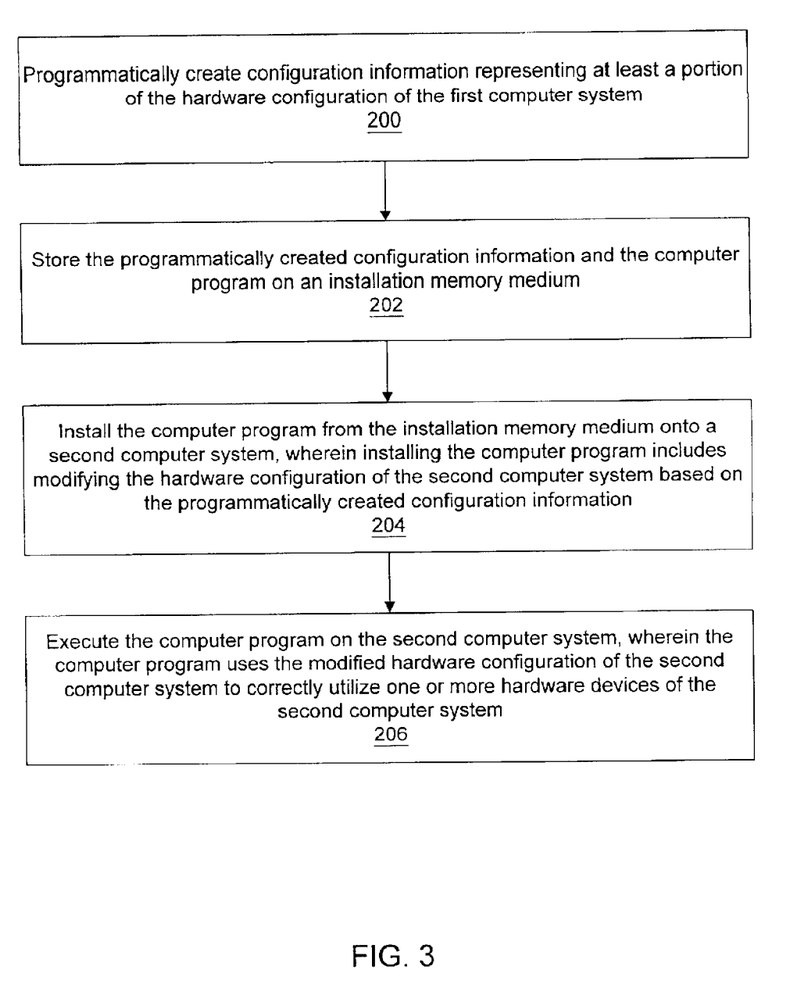
FIG. 3 is a flowchart diagram illustrating one embodiment of a method for deploying a hardware configuration with a computer program.

FIG. 3—Deploying a Hardware Configuration with a Computer Program

FIG. 3 is a flowchart diagram illustrating one embodiment of a method for deploying a hardware configuration with a computer program. The computer program may be a program that interacts with one or more hardware devices. In one embodiment, the computer program may perform an instrumentation function, such as a test and measurement or industrial automation function, and the program may interact with one or more instruments to perform the instrumentation function. The computer program may interact with any of various instruments or devices, such as any of the instruments or devices shown in FIGS. 1A and 1B. For example, the computer program may interact with an instrument that conforms to an instrumentation standard such as DAQ, GPIB, VXI, etc.

The program may be stored on a first computer system, and it may be desirable to port the program to a second computer system. For example, in one embodiment, a program developer may have developed the program on the first computer system and may desire to create an installation bundle enabling users to install the program on their own computer systems. In another embodiment, the program developer may desire to port the program to a second computer system for other reasons, e.g., to continue development of the program on the second computer system.

In step 200, configuration information representing at least a portion of the hardware configuration of the first computer system may be automatically, i.e., programmatically, created. This programmatically created configuration information may abstractly represent the current state of the relevant portion of the hardware configuration of the first computer system, i.e., may abstractly represent a portion of the hardware configuration that the program depends on in order to execute correctly. The information may be programmatically created in any of various formats. In one embodiment, the information is created in an extensible markup language (XML) format, a standard for representing information abstractly. Any of various methods may be used to programmatically create the configuration information. One embodiment of such a method is described below with reference to FIG. 4.

As used herein, the "hardware configuration" of the first computer system is intended to encompass any of various types of configuration information stored on the first computer system that pertains to hardware devices or instruments connected to the computer system. For example, the hardware configuration may include information specifying various hardware settings, such as interrupts, gain values, I.P. address, user-defined comments, single-ended v. differential channel settings, scaling parameters, calibration parameters, sensor excitation setting, etc., or various named elements that the program uses, such as named channels, named I/O operations, etc.

This configuration information may be stored on the first computer system in one or more files, databases, or registries. The configuration information may comprise information that is managed by the operating system and/or other utilities. For example, in one embodiment, the configuration information may be managed by software referred to herein as "driver-level" software. Driver-level software typically acts as an intermediate layer between a computer program and a hardware device. As one example, programs that utilize data acquisition (DAQ) devices may interface with DAQ driver-level software. The DAQ driver-level software may include device drivers for the DAQ devices connected to the computer system, may include a DAQ configuration manager that manages configuration information for the DAQ devices, etc.

In step 202, the programmatically created configuration information and the computer program may be stored, e.g., as one or more files, on a memory medium, e.g., an installation memory medium such as a CD-ROM or a memory medium of a server computer from which the program can be installed via a network. Executable program instructions operable to install the program on a new computer system may also be created and stored on the memory medium.

In step 204, the program may be installed from the installation memory medium onto the second computer system. For example, the executable instructions on the installation memory medium may be operable to store the program on the second computer system. These instructions may also be operable to modify the hardware configuration of the second computer system based on the programmatically created configuration information stored on the installation memory medium, to enable the program to execute correctly on the second computer system. One embodiment of step 204 is described in detail below with reference to FIG. 5.

In step 206, the program may be executed on the second computer system. The program may utilize the modified hardware configuration of the second computer system to correctly interact with one or more hardware devices of the second computer system.

Figure 4:
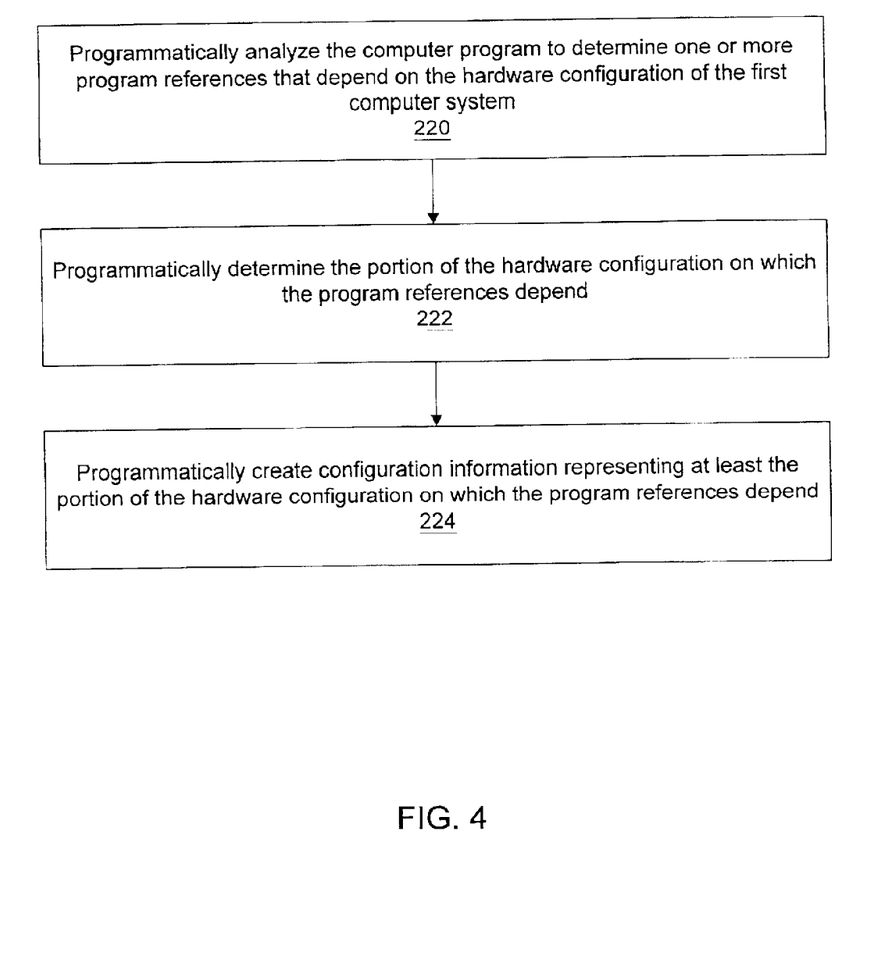
FIG. 4 is a flowchart diagram illustrating one embodiment of a method for programmatically creating configuration information representing at least a portion of the hardware configuration of a first computer system.

FIG. 4—Programatically Creating the Configuration Information

FIG. 4 is a flowchart diagram illustrating one embodiment of step 200 of FIG. 3, in which the configuration information is programmatically created.

In step 220, an application or tool may programmatically analyze the computer program to determine one or more program references that depend on the hardware configuration of the first computer system. In one embodiment, the application or tool that performs this analysis may be (or may be part of) an application development environment (ADE) used to develop the program. For example, when a program developer is ready to distribute his program, he may request an installation bundle to be created, and in response the application development environment may perform the program analysis.

The computer program may be analyzed in any of various ways, e.g., depending on the type of program. For example, the program may be written using any of various types of programming languages or application development environments. In one embodiment, the program may be a text-based program, i.e., a program written using a text-based programming language such as C, C++, Java, Visual Basic, etc. In this instance, analyzing the program may comprise determining function or method calls that depend on the hardware configuration. For example, the function or method calls may be determined by parsing the text of the program or using information available from the compiler to determine which function/method calls are present in the program. In another embodiment the function or method calls may be determined by intercepting the calls during execution of the program on the first computer system.

In another embodiment, the program may be a graphical program. In this instance, analyzing the program may comprise determining block diagram nodes present in the graphical program that depend on the hardware configuration. The above-incorporated patent application titled, "System and Method for Programmatically Creating a Graphical Program" describes a system enabling a graphical program to be programmatically analyzed to determine nodes of the graphical program.

In various embodiments, the program references that are determined in step 220 may depend on any aspect of the hardware configuration of the first computer system. In one embodiment, the application or tool may be operable to determine program references related to one or more general classes or types of hardware devices or instruments, e.g., DAQ devices, GPIB devices, VXI devices, etc. For example, the application or tool may be operable to determine program references that depend on DAQ device configuration information by searching for all function/method calls (or block diagram nodes) used by the program that come from a DAQ application programming interface (API).

In step 222, one or more portions of the hardware configuration on which the program references depend may be determined. This may involve examining each program reference (e.g., function/method call or node) that depends on the hardware configuration of the first computer system to determine which portion of the hardware configuration the program reference depends on. For example, consider a program that calls a DAQ analog input function that takes a virtual channel as a parameter, wherein the virtual channel maps to a desired input/output address of a DAQ device from which to read. In this example, examining the function call may determine that the function call depends on DAQ virtual channel configuration information, and in particular depends on the information for the particular virtual channel name passed to the function.

In step 224, configuration information representing at least the portion of the hardware configuration on which the program references depend may be automatically, i.e., programmatically, created. For example, for the above-described program that depends on the DAQ virtual channel, configuration information abstractly representing this virtual channel may be programmatically created so that when the program is installed on the second computer system, the virtual channel can be re-created on the second computer system. As described above, the configuration information may be represented using any of various formats, such as an extensible markup language (XML) format.

In one embodiment, a plug-in architecture may be utilized which allows different software components to be responsible for performing steps 220–224 for different types or classes of hardware devices or instruments. For example, a DAQ software component may be responsible for determining DAQ program references, determining a portion of the DAQ configuration information on which these DAQ program references depend, programmatically creating configuration information representing this portion of the DAQ configuration information, etc. Other software components may be responsible for performing these steps for different types of devices, e.g., GPIB devices, VXI devices, etc.

It is noted that step 200 may be performed in any of various other ways, as desired. For example, in an alternative embodiment, a graphical user interface may be presented to the user, allowing him to specify the desired portions of the hardware configuration of the first computer system for which to create configuration information. In one embodiment, the method may first attempt to automatically discover the relevant portions of the hardware configuration and may then present a list of these portions to the user. The user may then make modifications by specifying additional portions of the hardware configuration to add to the list for which to create configuration information or by removing some portions from the list.

In another embodiment, the method may simply create configuration information representing the entire hardware configuration of the first computer system or representing the entire hardware configuration of certain classes of devices, e.g., DAQ devices, GPIB devices, VXI devices, etc.

Figure 5:
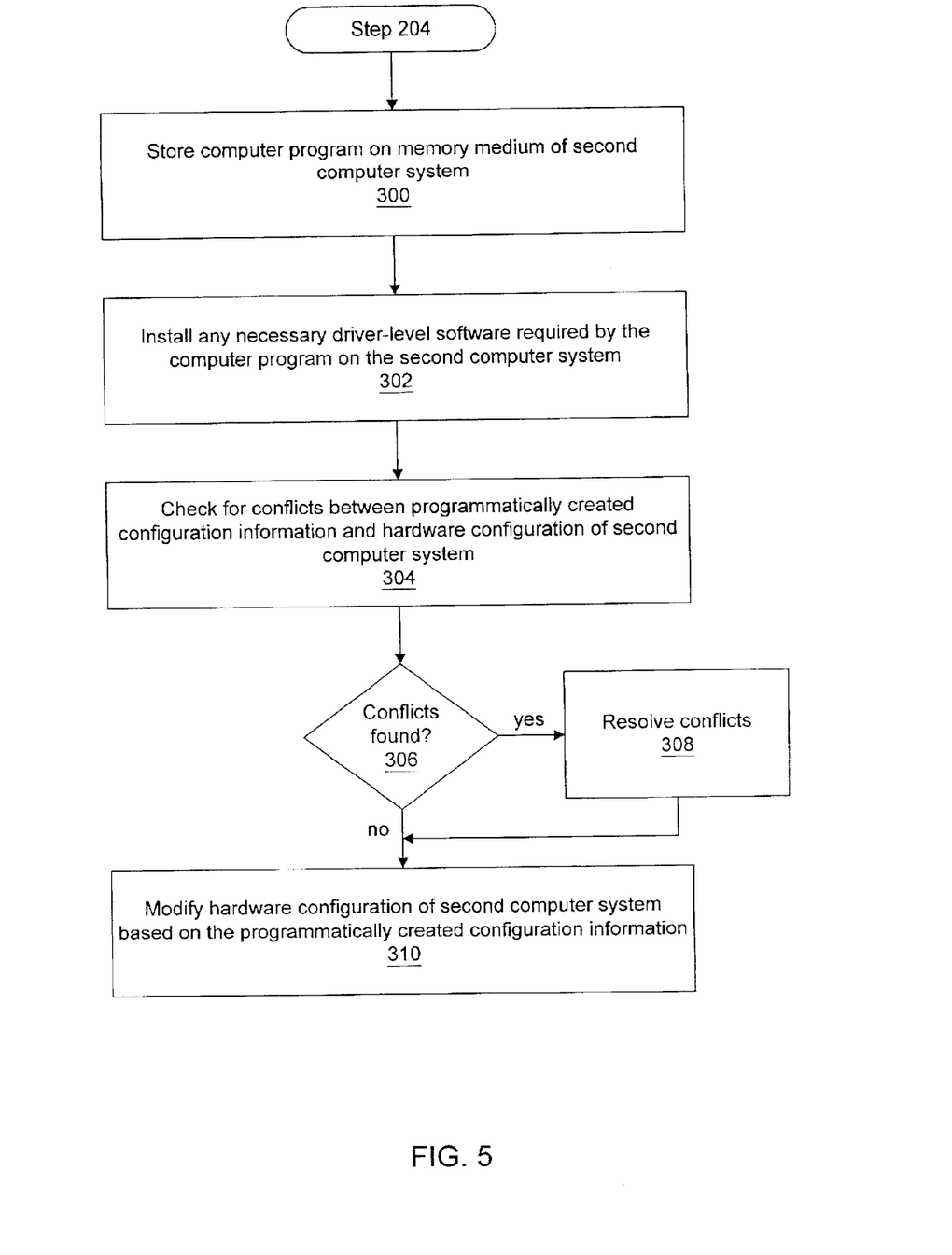
FIG. 5 is a flowchart diagram illustrating one embodiment of a method for installing the computer program onto a second computer system and modifying the hardware configuration of the second computer system based on the programmatically creating configuration information.

FIG. 5—Modifying the Hardware Configuration of the Second Computer System

FIG. 5 is a flowchart diagram illustrating one embodiment of step 204 of FIG. 3, in which the program is installed onto the second computer system.

In step 300, the computer program may be stored on a memory medium of the second computer system, e.g., a hard disk. The program may be stored in various ways, e.g., depending on the type of program and the computing platform. In one embodiment, only executable files for the program are stored on the second computer system. This may be desirable, for example, if the program is being distributed commercially. In another embodiment, source code for the program may (also) be stored on the second computer system. This may be desirable, for example, to enable a user of the second computer system to modify the program.

As shown in step 302, if the program requires any driver-level software, this driver-level software may also be installed on the second computer system. For example, if the program includes a DAQ program reference, then DAQ driver-level software may be installed if not already present. Thus, step 202 of FIG. 3 may also comprise storing driver-level software on the installation memory medium so that this driver-level software can also be installed along with the program.

In step 304, conflicts between the programmatically created configuration information stored on the installation memory medium and the hardware configuration of the second computer system may be checked for. If no conflicts are found, then in step 310, the hardware configuration of the second computer system may be modified based on the programmatically created configuration information. Otherwise, in step 308 the conflicts may be resolved.

If conflicts between the programmatically created configuration information stored on the installation memory medium and the hardware configuration of the second computer system are found, these conflicts may be resolved in any of various ways. Some conflicts may be resolved automatically. For example, consider a case where the program references a virtual channel that mapped to a DAQ device in expansion slot 0 of the first computer system. If the second computer system does not have a DAQ device connected in expansion slot 0, there would be a conflict. However, if it is determined that the second computer system has a comparable DAQ device connected in expansion slot 1, then the conflict could be resolved automatically by changing the virtual channel to map to the DAQ device in slot 1. This virtual channel information could then be added to the DAQ configuration information of the second computer system.

For other types of conflicts, it may be desirable to prompt the user to determine how to handle the conflict. For example, consider a case where the program references a virtual channel named "Voltage". If the second computer system already has a virtual channel named "Voltage" and this virtual channel is configured differently from the one referenced by the program, then it may be desirable to prompt the user to decide what to do. For example, the user may be provided with options to delete the existing virtual channel information from the second computer system, change the virtual channel name referenced by the program to a new name and add the virtual channel information to the second computer system under this new name, leave the conflict unresolved, etc. In one embodiment, the user may be able to configure which types of conflicts he desires to be made automatically and which types of conflicts he wants to be prompted about.

In one embodiment, the steps of FIG. 5 may be performed by executable instructions stored on the installation memory medium. In another embodiment, one or more of the steps may be performed by software installed on the second computer system. For example, the executable instructions stored on the installation memory medium may be operable to store the programmatically created configuration information on the second computer system without applying the configuration information, i.e., without modifying the hardware configuration of the second computer system. An application development environment associated with the program may then be operable to determine whether there are any conflicts between the current hardware configuration and the configuration required by the program, may resolve these conflicts, etc. In one embodiment, a plug-in architecture may be utilized, similarly as described above. Different components may be responsible for different types or classes of hardware devices or instruments, i.e., to check for conflicts related to a particular device class, to modify configuration information for that device class, etc.

In one embodiment, if there are conflicts then an application development environment or execution system may be operable to temporarily modify the hardware configuration of the second computer system each time before executing the program, to temporarily resolve the conflicts. For example, before running the program, all of the programmatically created configuration information may be applied to the second computer system to enable the program to execute correctly. Upon program exit, the previous configuration state may be reinstated so that other programs requiring the previous configuration still execute correctly.

Figure 6:
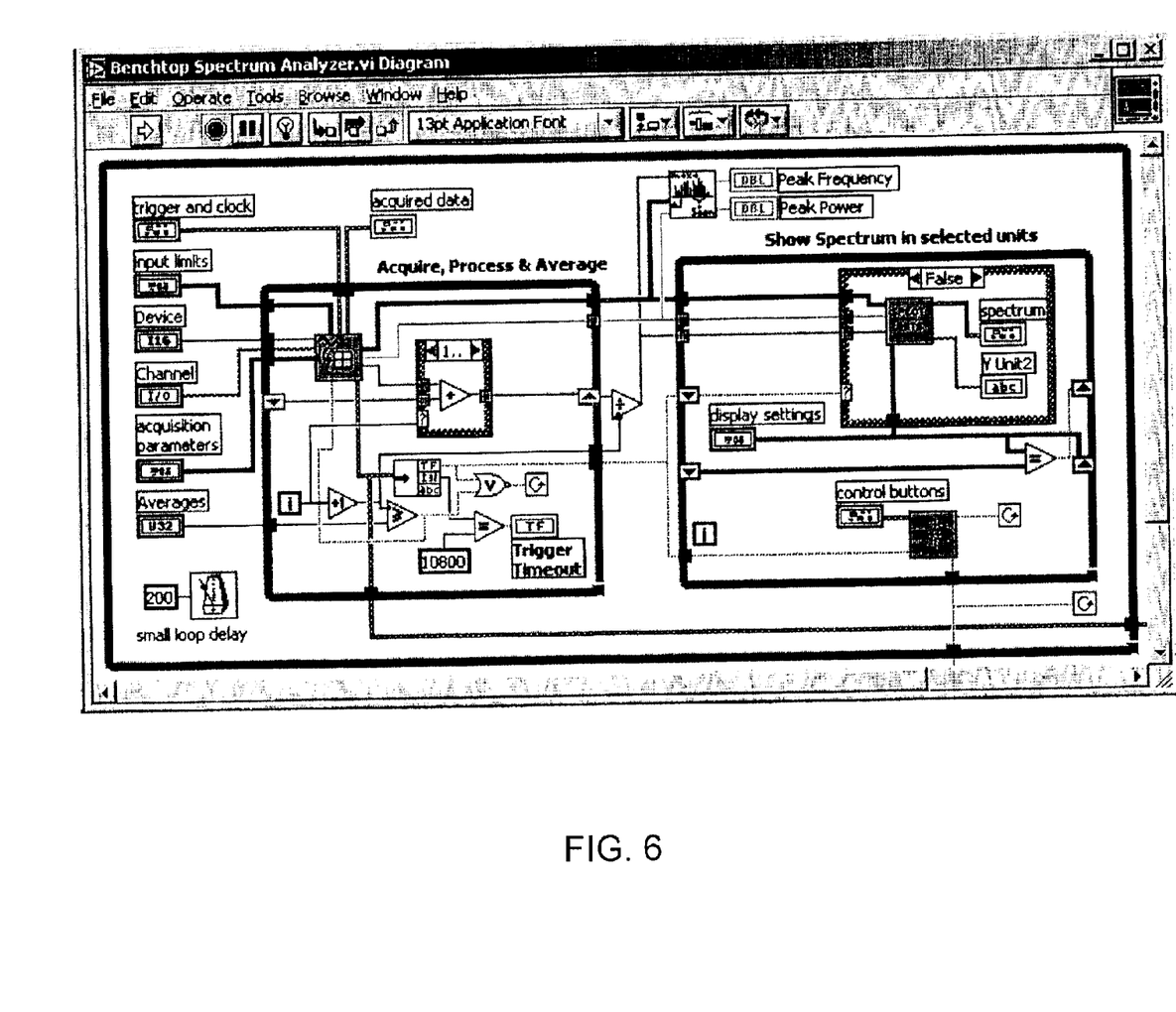
FIGS. 6–7 illustrate an exemplary graphical program that interacts with a DAQ hardware device.
Figure 7:
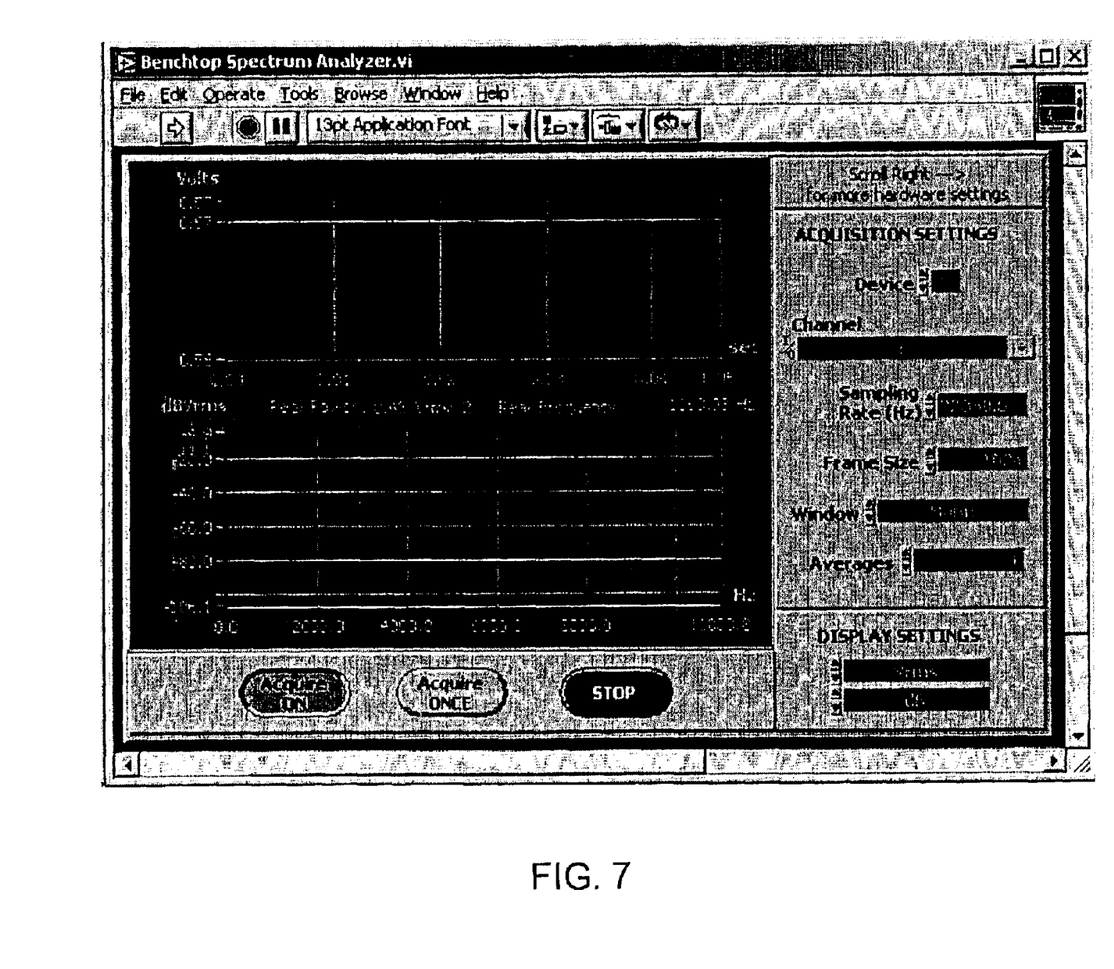

FIGS. 6–7: Graphical Program Example

FIGS. 6–7 illustrate an exemplary graphical program that interacts with a DAQ hardware device. FIG. 6 illustrates the block diagram of the graphical program, and FIG. 7 illustrates the user interface of the graphical program. Graphical programming is a popular programming paradigm among scientists and engineers, especially those that create programs that interact with instrumentation devices. A graphical program may include a plurality of interconnected nodes arranged in a block diagram, wherein the interconnected nodes visually indicate functionality of the graphical program. The block diagram may have one or more of data flow, control flow, and/or execution flow representations. The program developer may create the block diagram by placing or "dragging and dropping" icons or nodes in the block diagram and interconnecting the nodes in a desired fashion. FIGS. 6–7 illustrate a graphical program created using the LabVIEW graphical program development environment.

This example implements a benchtop spectrum analyzer that computes an RMS averaged power spectrum on a single channel using a variety of windows. It also detects the peak frequency component and estimates the actual frequency and power. The node labeled "channel" is used to specify a virtual channel identifying an analog input channel from which to measure. In this example, information representing the specified virtual channel may be programmatically created and packaged with the program in an installation bundle. When the program is installed on a new computer system, the virtual channel information may be added to the DAQ configuration information of the second computer system if a virtual channel of that name is not already present. If a virtual channel of that name is already present, the conflict may be resolved as described above. If the exact device from the "old" computer system is not present on the new computer system, the problem may be resolved by locating the exact device in a different plug-in slot or by locating a similar device that can satisfy the I/O needs of the defined channel.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for installing a computer program, the method comprising:

programmatically creating configuration information representing a hardware configuration of a first computer system, wherein the first computer system stores a computer program having one or more program references that depend on the hardware configuration; and installing the computer program on a second computer system, wherein said installing comprises modifying a hardware configuration of the second computer system based on the programmatically created configuration information;

wherein said modifying the hardware configuration of the second computer system enables the computer program to utilize one or more hardware devices of the second computer system during execution of the computer program on the second computer system.

2. The method of claim 1, wherein said programmatically creating configuration information comprises:

programmatically analyzing the computer program to determine the one or more program references that depend on the hardware configuration;

programmatically determining a portion of the hardware configuration on which the program references depend; and programmatically creating configuration information representing at least the portion of the hardware configuration on which the program references depend.

3. The method of claim 1, wherein the one or more program references that depend on the hardware configuration comprise one or more program references to a hardware device of the first computer system.

4. The method of claim 1, wherein the one or more program references that depend on the hardware configuration comprise one or more of:
a function call;
a method call;
a graphical program node.

5. The method of claim 1, further comprising:

storing the programmatically created configuration information on a memory medium; and storing the computer program on the memory medium;

wherein said installing the computer program on the second computer system using the programmatically created configuration information comprises installing the computer program from the memory medium.

6. The method of claim 5, wherein said storing the programmatically created configuration information on the memory medium and said storing the computer program on the memory medium are performed in response to user input requesting creation of an installation program for the computer program.

7. The method of claim 1, wherein the one or more program references that depend on the hardware configuration include one or more program references that depend on driver-level software, the method further comprising:

installing the driver-level software on the second computer system.

8. The method of claim 1, wherein said modifying the hardware configuration of the second computer system comprises one or more of:
modifying a driver-level software setting;
modifying a virtual channel configuration;
modifying a scale configuration;
modifying a task configuration; and
modifying a tag configuration.

9. The method of claim 1, further comprising:

detecting a conflict between the programmatically created configuration information and the hardware configuration of the second computer system; and resolving the conflict.

10. The method of claim 9, wherein said resolving the conflict comprises automatically resolving the conflict without receiving user input.

11. The method of claim 9, wherein said resolving the conflict comprises:

displaying information on a display indicating the conflict;

receiving user input specifying how to resolve the conflict;

resolving the conflict according to the user input.

12. The method of claim 9, wherein said resolving the conflict comprises automatically changing the computer program to avoid the conflict.

13. The method of claim 1, wherein the one or more program references that depend on the hardware configuration comprise one or more program references to a first hardware device of the first computer system, the method further comprising:

detecting a second hardware device of the second computer system that corresponds to the first hardware device of the first computer system;

wherein said modifying the hardware configuration of the second computer system comprises modifying the hardware configuration of the second computer system to enable the computer program to utilize the second hardware device during execution of the computer program on the second computer system.

14. The method of claim 1, wherein the programmatically created configuration information comprises extensible markup language (XML) information.

15. The method of claim 1, wherein the computer program is a graphical program.

16. The method of claim 15, wherein the graphical program comprises a plurality of interconnected nodes that visually indicate functionality of the graphical program.

17. The method of claim 15, wherein the graphical program comprises a data flow block diagram.

18. The method of claim 1, further comprising:

programmatically analyzing the graphical program to determine the one or more program references that depend on the hardware configuration.

19. The method of claim 1, wherein the computer program performs an instrumentation function;

wherein said modifying the hardware configuration of the second computer system enables the computer program to utilize one or more instruments coupled to the second computer system to correctly perform the instrumentation function.

20. The method of claim 19, wherein the instrumentation function performed by the computer program comprises one or more of:

a test and measurement function;
an industrial automation function.

21. The method of claim 1, wherein said modifying the hardware configuration of the second computer system comprises modifying one or more of the following types of hardware configuration information:

DAQ hardware configuration information;
GPIB hardware configuration information;
VXI hardware configuration information.

22. A computer-implemented method for installing a computer program, the method comprising:

storing a computer program on a first computer system, wherein the first computer system has a first hardware configuration, wherein the computer program comprises one or more program references that depend on the first hardware configuration;

programmatically creating configuration information representing the first hardware configuration of the first computer system; and installing the computer program on a second computer system, wherein the second computer system has a second hardware configuration, wherein said installing comprises modifying the second hardware configuration of the second computer system based on the programmatically created configuration information;

wherein said modifying the hardware configuration of the second computer system enables the computer program to utilize one or more hardware devices of the second computer system during execution of the computer program on the second computer system.

23. A computer-implemented method for installing a computer program, the method comprising:

storing a computer program on a first computer system, wherein the first computer system has a first hardware configuration, wherein the computer program comprises one or more program references that depend on the first hardware configuration;

programmatically creating configuration information representing the first hardware configuration of the first computer system;

associating the configuration information with the computer program;

wherein, during installation of the computer program on a second computer system, the configuration information is useable in modifying a hardware configuration of the second computer system to enable proper operation of the computer program on the second computer system.

* * * * *